United States Patent
Kimura et al.

(10) Patent No.: US 8,523,263 B2
(45) Date of Patent: Sep. 3, 2013

(54) POWER SLIDE DEVICE FOR VEHICLE SEAT

(75) Inventors: Akihiro Kimura, Kanagawa (JP);
Hirohito Aoi, Kanagawa (JP);
Toshiharu Ito, Kanagawa (JP)

(73) Assignee: Shiroki Corporation, Kanagawa (JP)

( * ) Notice: Subject to any disclaimer, the term of this patent is extended or adjusted under 35 U.S.C. 154(b) by 358 days.

(21) Appl. No.: 13/000,441

(22) PCT Filed: Jun. 5, 2009

(86) PCT No.: PCT/JP2009/060342
§ 371 (c)(1),
(2), (4) Date: Dec. 21, 2010

(87) PCT Pub. No.: WO2009/157291
PCT Pub. Date: Dec. 30, 2009

(65) Prior Publication Data
US 2011/0095160 A1    Apr. 28, 2011

(30) Foreign Application Priority Data
Jun. 24, 2008    (JP) ................................. 2008-164113

(51) Int. Cl.
*F16M 11/00* (2006.01)
(52) U.S. Cl.
USPC .......................... 296/65.13; 248/429; 297/330
(58) Field of Classification Search
USPC ................ 296/65.13, 65.14, 65.15; 248/430, 248/429; 297/330
See application file for complete search history.

(56) References Cited

U.S. PATENT DOCUMENTS

| | | | |
|---|---|---|---|
| 6,688,667 B2 * | 2/2004 | Nishimoto et al. | 296/65.15 |
| 6,971,620 B2 * | 12/2005 | Moradell et al. | 248/422 |
| 7,887,020 B2 * | 2/2011 | Ferguson et al. | 248/429 |
| 2006/0289717 A1 | 12/2006 | Ito | |
| 2008/0078908 A1 | 4/2008 | Koga | |

FOREIGN PATENT DOCUMENTS

| | | |
|---|---|---|
| JP | 11123960 A | 5/1999 |
| JP | 2004352081 A | 12/2004 |
| JP | 20071508 A | 1/2007 |
| JP | 2007126103 A | 5/2007 |

OTHER PUBLICATIONS

Supplementary European Search Report for EP 09770001 dated May 25, 2012.
Patent Abstracts of Japan. "English Abstract—Power Seat for Vehicle." JP11123960A, Applicant: Delta Kogyo Co Ltd, May 11, 1999.
Patent Abstracts of Japan. "English Abstract-Power Seat Slide Device." JP2004352081A, Applicant: Shiroki Corp, Dec. 16, 2004.
Patent Abstracts of Japan. "English Abstract-Power Seat Sliding Device for Vehicle." JP2007126103A, Applicant: Aisin Seiki Co Ltd, May 24, 2007.
World IP Organization. "International Search Report." PCT/JP2009/060342. Applicant: Shiroki Corp, Searching Authority: JP, Mailed: Aug. 27, 2009.

* cited by examiner

*Primary Examiner* — Joseph Pape
(74) *Attorney, Agent, or Firm* — Millen, White, Zelano & Branigan, P.C.

(57) ABSTRACT

In a power slide device for vehicle seat which moves an upper rail in the forward/rearward direction by rotationally driving a screw rod, by providing a screw rod supporting rail with a pair of load transmitting members that are spaced from each other in the forward/rearward direction and providing the screw rod with a load receiving member which is in contact with the pair of load transmitting members, buckling is supported at a plurality of points when the buckling occurs in the screw rod due to an axial force acting on the screw rod, and this limits the direction of the buckling to reduce the amount of the buckling.

20 Claims, 9 Drawing Sheets

POWER SLIDE DEVICE FOR VEHICLE SEAT

FIELD OF THE INVENTION

The present invention relates to a power slide device which moves a vehicle seat in the forward/rearward direction using a motor-driven feed screw mechanism.

BACKGROUND OF THE INVENTION

A seat slide device for vehicle seat has a basic structure in which an upper rail fixed to a seat is slidably engaged with a lower rail which is fixed to a vehicle floor to extend in the forward/rearward direction. This seat slide device is motorized by supporting a motor-driven screw rod on one of the upper and lower rails to extend in a direction of extension thereof in a manner to allow the screw rod to rotate and by fixing a nut member which is screwed onto a nut screwing portion of the screw rod to the other of the upper and lower rails.

The screw rod is rotatably supported between a gear box which is installed at an end (usually the front end) of one of the upper and lower rails and a bearing installed at the rear end of this one of the upper and lower rails. In addition, a load transmitting member (load transmitting bracket), which supports the screw rod in a manner to allow the screw rod to rotate and prevent load caused upon a collision from being transmitted directly to the gear box by dispersing the load, is fixed to the rail which supports the screw rod.

PRIOR ART

Patent Documents

Patent Document 1: Japanese Unexamined Patent Publication No. 2008-80997
Patent Document 2: U.S. Pat. No. 5,456,439.

SUMMARY OF THE INVENTION

Problems to be Solved by the Invention

However, in conventional devices if, e.g., a bucking load is exerted on the screw rod upon a collision, the screw rod largely buckles due to the screw rod and the load transmitting member being connected together, in effect, at one point (narrow range) in the axial direction of the screw rod; as a result, a sufficient impact resistant force cannot be obtained, which is a problem.

The present invention has been devised in view of the issues described above, and an objective of the present invention is to provide a power slide device which reduces the amount of buckling in the screw rod upon a collision load being exerted on the screw rod via the load transmitting member to thereby make it possible to improve the impact resistance force.

Means for Solving the Problem

The prevent invention has been accomplished based on the finding that, by providing a screw rod supporting rail with a pair of load transmitting members that are spaced from each other in the forward/rearward direction (screw-rod extension direction) and providing a screw rod with a pair of load receiving members which are respectively in contact with inner surfaces of the pair of load transmitting members, buckling is supported at a plurality of points when the buckling occurs in the screw rod due to an axial force acting on the screw rod, and this limits the direction of the buckling to reduce the amount of the buckling of the screw rod.

A power slide device of a vehicle seat according to the present invention includes a lower rail disposed on a floor surface of a vehicle, an upper rail disposed on a seat and engaged with the lower rail in a slidable manner, a screw rod which is rotatably supported by one of the upper rail and the lower rail, a gear box, provided at an end of the screw rod supporting rail, for rotationally driving the screw rod, a feed nut which is screw-engaged with the screw rod and fixed to the other of the upper rail and the lower rail, a pair of load transmitting members which are held by the screw rod supporting rail at positions spaced from each other in an extension direction of the screw rod supporting rail, and at least one load receiving member which is positioned between the pair of load transmitting members and provided on the screw rod in a manner to restrict a position of the load receiving member on the screw rod in an axial direction thereof. The feed nut supporting rail and the screw rod supporting rail are respectively provided with openings which face each other. The pair of load transmitting members are provided with force application portions that are positioned closer to the opening side of the screw rod supporting rail than the screw rod.

The force application portions are not normally in contact with the screw rod and come in contact with the screw rod when at least one of the screw rod and the pair of load transmitting members is deformed.

In the power slide device according to the present invention, a load transmission from the seat to the vehicle is performed in order from one of the pair of load transmitting members, the load receiving member and the other of the pair of load transmitting members.

The load receiving member can be installed between the pair of load transmitting members so as to come in contact with inner surfaces of the pair of load transmitting members in a manner such as the following:

1. A single nut member which is screwed onto the screw rod and fixed thereto. The structure can be simplified due to this single nut member.

2. It is possible for the single nut member to be provided with a small-diameter stepped portion, without having a female thread, and for the screw rod be provided with a small-diameter stepped portion, without having a male thread, which corresponds to the small-diameter stepped portion of the single nut member. Providing these small-diameter stepped portions in this manner makes it possible to increase the bearing surface area between the screw rod and the nut member.

3. A pair of nut members which are screwed onto the screw rod and fixed thereto. The dimensional adjustment with respect to the pair of load transmitting members can be easily performed due to the pair of nut members.

4. A washer member which is fitted on a small-diameter step portion of the screw rod, which does not have a male thread, and a nut member which is screwed onto the screw rod and fixed thereto. The bearing surface area can be increased and the dimensional adjustment with respect to the pair of load transmitting members can be easily performed due to this washer member and this nut member.

5. In any of the nut members having different configurations described above, it is desirable that the nut member be plastically deformed to make the inner diameter of the female thread portion thereof smaller than the nominal diameter to thereby provide the nut member with a locking portion which increases the rotational resistance to the screw rod before the nut member is screwed onto the screw rod. Providing such a locking portion to the nut member in this manner makes it possible to omit a swaging process, which increases productivity.

Either swaging, fastening with glue, or knock-pin can be used as a fixing device for fixing the load receiving member and the screw rod to each other.

The gear box can be supported by the load transmitting members. If the gear box is supported by the load transmitting members, the structure can be simplified.

In another embodiment, the gear box can be supported by a gear box support bracket which is a separate member from the load transmitting members and connected to the load transmitting members. According to this feature, the holding stiffness of the gear box can be increased.

In still another embodiment, it is possible for the gear box to be supported by the screw rod supporting rail so that the load transmitting members are not involved in supporting the gear box. If the gear box is supported by the screw rod supporting rail, the positional accuracy of the gear box with respect to the support rail can be improved.

It is possible for a sleeve made of synthetic resin which supports the screw rod in a manner to allow the screw rod to rotate relative to the sleeve to be fitted in at least one of the screw rod insertion holes of the pair of load transmitting members so that the screw rod is supported more stably in a rotatable manner, which makes it possible to improve the accuracy of the bearing for the screw rod.

There is a degree of freedom in the manner of installing the pair of load transmitting members that are mounted to the screw rod supporting rail; different load transmitting members can be fixed to the screw rod supporting rail, or the pair of load transmitting members can be connected to each other in advance. In the embodiment in which the pair of load transmitting members are connected to each other in advance, a U-shaped load transmitting bracket which includes a pair of load transmitting members (load transmitting walls) and a stationary wall connecting, the pair of load transmitting members to each other and which is fixed to the screw rod supporting rail, can be used. Due to this U-shaped load transmitting bracket, the number of elements can be reduced and the accuracy between the pair of load transmitting members can be improved.

In the power slide device for vehicle seat according to the present invention, it is desirable for one of the pair of load transmitting members which is closer to the feed nut either to be supported in a manner so as not to be easily deformed by a force in a forward/rearward direction of the vehicle or has a characteristic of not being easily deformed by the force in the forward/rearward direction of the vehicle. The force application portions of the pair of load transmitting members come in contact with the screw rod to provide the screw rod with fulcrums at which the screw rod buckles when the load transmitting members is deformed.

More specifically, it is possible for the one of the pair of load transmitting members, which is closer to the feed nut, to be provided with a plurality of support projections which are engaged in a plurality of fixing holes formed in the screw rod supporting rail, respectively, and for the other of the pair of load transmitting members, which is farther from the feed nut, to be provided with none of such support projections (or fixing holes). According to this structure, the deformation strength of the load transmitting member provided with the support projections can be clearly made greater than the deformation strength of the load transmitting member provided with no support projections.

Alternatively, it is possible for each of the pair of load transmitting members to include a plurality of support projections, wherein the screw rod supporting rail has a plurality of fixing holes in which the plurality of support projections are engaged. Clearances between support projections of the pair of load transmitting members and the fixing holes of the screw rod supporting rail in the forward/rearward direction are set so that a clearance between the support projections of the load transmitting member which is farther from the feed nut and the fixing holes engaged therewith is set greater than a clearance between the support projections of the load transmitting member which is closer to the feed nut and the fixing holes engaged therewith. This structure makes it possible to control the amount of deformation according to the amount of clearance.

In a more specific embodiment, in order to improve the outward appearance so that the gear box, the load transmitting members and the feed nut are not exposed, it is practical for the screw rod to be supported by the movable upper rail and for the feed nut to be fixed to the immovable lower rail. In addition, it is desirable for the gear box to be installed at the front end of the upper rail. The pair of load transmitting members can be disposed at the rear of the feed nut; however, to control the buckling direction of the screw rod in a more desirable manner it is practical for the pair of load transmitting members to be disposed between the gear box and the feed nut, i.e., that the gear box, the load transmitting members and the feed nut be arranged in that order.

It is desirable for a reducing process to be performed on a round bar blank, which corresponds to the screw rod before threading is performed thereon, by exerting a compressive load on the round bar blank in a radial direction to increase the rigidity of the screw rod.

Effects of the Invention

A feature of the prevent invention is that a pair of load transmitting members for transmitting loads caused upon a collision to a screw nut is held by a screw rod supporting rail in addition to a screw rod and a feed nut and that at least one load receiving member is positioned between the pair of load transmitting members and provided on the screw rod in a manner to restrict the position of the load receiving member on the screw rod in the axial direction thereof, the feed nut supporting rail and the screw rod supporting rail have openings which face each other, respectively, and the pair of load transmitting members are provided with force application portions positioned closer to the opening side of the screw rod supporting rail than the screw rod. Accordingly, bucking is supported at a plurality of points when buckling occurs in the screw rod due to an axial force acting on the screw rod, and this can limit the direction of the buckling to reduce the amount of the buckling of the screw rod. Namely, the force application portions of the pair of load transmitting members are not normally in contact with the screw rod, and come in contact with the screw rod to serve as the aforementioned multiple buckling points when at least one of the screw rod and the pair of load transmitting members is deformed.

EMBODIMENTS

Figure 13:
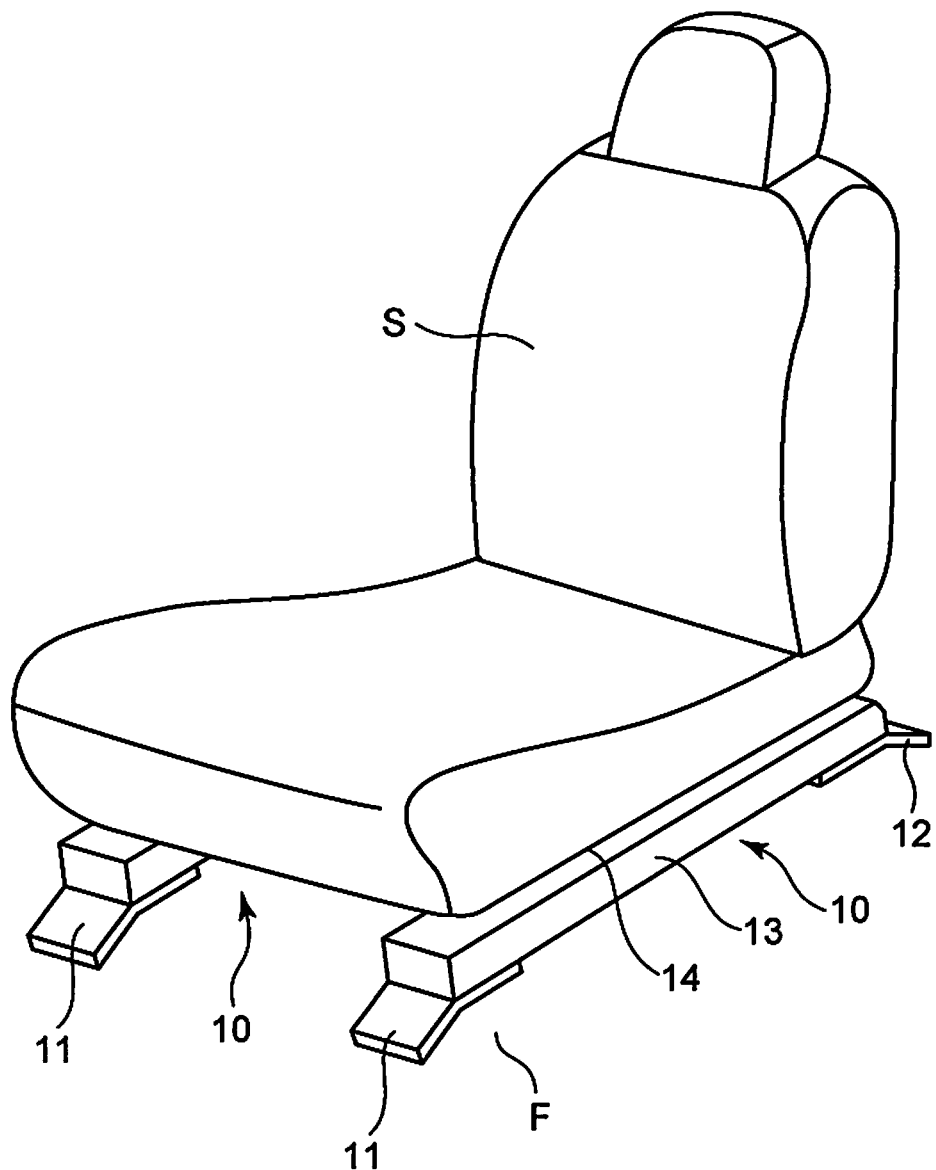
FIG. 13 is a perspective view showing a general structure of a vehicle seat slide device.

A vehicle seat slide device is provided with a pair of (left and right) seat tracks 10 which are positioned between a vehicle seat S and a floor surface F and extend in the forward/rearward direction of the vehicle as shown in FIG. 13. The left and right seat tracks 10 are mutually identical (symmetrically) in structure, each having a lower rail 13 that is fixed to the floor surface F by front and rear brackets 11 and 12, and an upper rail 14 that is fixed to the seat S. The lower rail 13 and the upper rail 14 are slidably engaged with each other. The lower rail 13 and the upper rail 14 respectively have openings which face each other.

Figure 1:
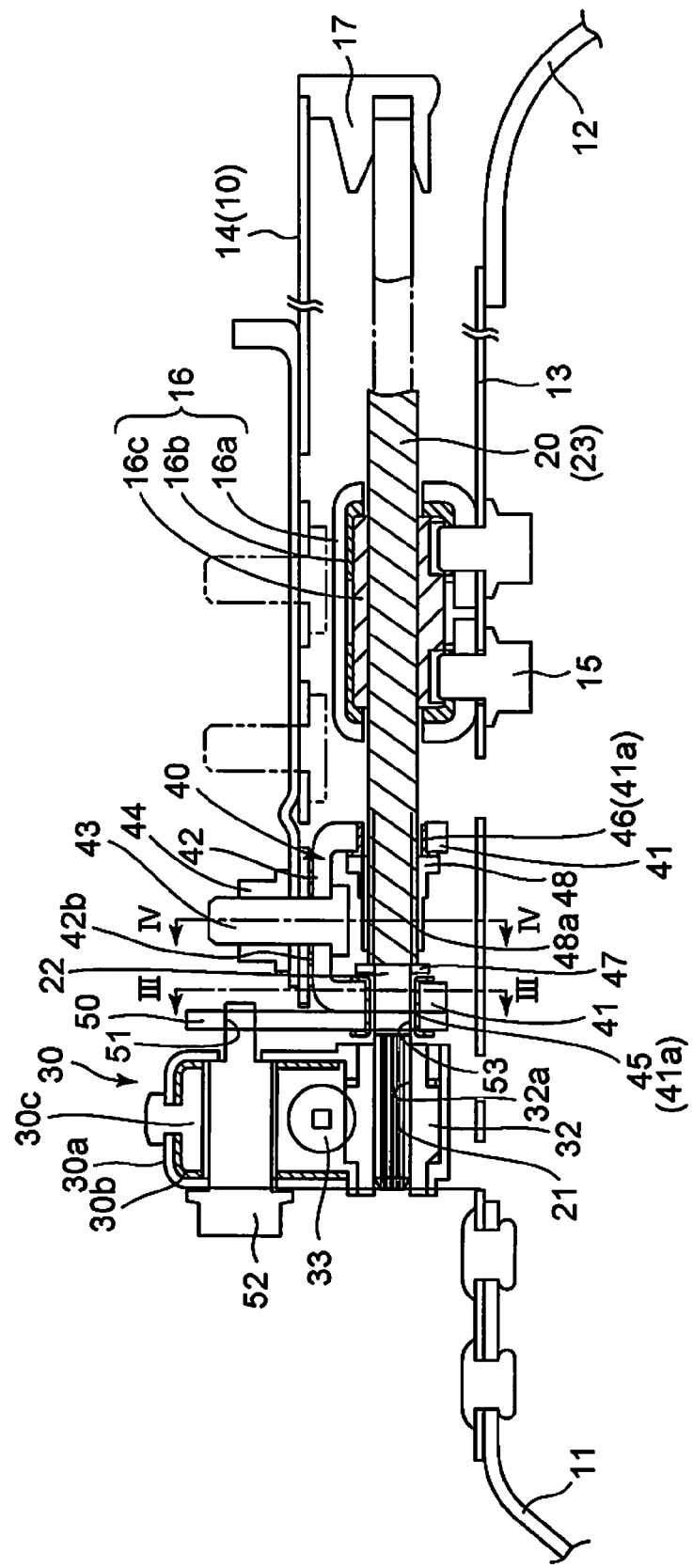
FIG. 1 is a longitudinal sectional view of an embodiment of a power slide device according to the present invention.

A feed nut 16, the axis of which extends in the forward/rearward direction, is fixed to the lower rail 13 via locking bolts 15 as shown in FIG. 1. The feed nut 16 is configured by inserting a nut 16c made of synthetic resin into a metal outer casing 16a via a shock-absorbing rubber sheet 16b. The lower rail 13 is a feed-nut fixed rail.

Whereas a screw rod 20 onto which the feed nut 16 is screwed is supported by the upper rail 14 to be rotatable. More specifically, a gear box 30 and a bearing member 17, which support the front end and the rear end of the screw rod 20 in a manner to allow the front end and the rear end of the screw rod 20 to rotate, are installed at the front end and the rear end of the upper rail (screw rod supporting rail) 14, respectively. FIG. 1 shows the limit of forward movement of the upper rail 14 (the seat S) with respect to the lower rail 13 (the left of FIG. 1 corresponds to the front).

The screw rod 20 is provided at the front end thereof with a serrated portion 21, and a worm wheel 32 which is provided in an axial portion thereof with a serrated hole 32a that is relatively irrotatably engaged with the serrated portion 21 is supported by the gear box 30 therein to be rotatable. The worm wheel 32 is engaged with a worm 33, the axis of which extends in the leftward/rightward direction of the vehicle. Forward and reverse rotations of the worm 33 cause the worm wheel to rotate forward and rearward, thus causing the serrated portion 21 (the screw rod 20) to rotate forward and rearward, respectively. In the gear box 30, a mechanical member 30c is supported in a metal outer casing 30a via a shock-absorbing rubber sheet 30b.

The worms 33 in the gear boxes 30 of the left and right upper rails 14 rotate in association with each other via an interlocking mechanism, and this interlocking rotation causes the screw rods 20 of the left and right upper rails 14 to rotate forwardly and reversely. Thereupon, the upper rails 14 (the seat S) move forward and rearward since the screw rods 20 are screw-engaged with the feed nuts 16 that are fixed to the lower rails 13, respectively.

A load transmitting bracket 40 is fixed to the upper rail 14 and disposed between the gear box 30 and the feed nut 16. As shown in FIGS. 1 through 4, the load transmitting bracket 40 is in the shape of a letter U, including a pair of load transmitting walls (load transmitting members) 41 that are spaced from each other in the axial direction of the screw rod 20 (the lengthwise direction of the seat track 10) and a stationary wall 42 that extends along the upper rail 14 to connect the pair of load transmitting walls 41 to each other, and two insertion holes 41a into which the screw rod 20 is inserted are formed in the pair of load transmitting walls 41, respectively. Although the insertion holes 41a are not normally in contact with the screw rod 20, lower surfaces in the insertion holes 41a with respect to the drawings (surfaces in the insertion holes 41a which are closer to the opening side of the upper rail than the screw rod 20) act as force application portions which determine the direction of deformation (buckling) of the screw rod 20 when at least one of the screw rod 20 and the pair of load transmitting walls 41 is deformed.

Figure 2:
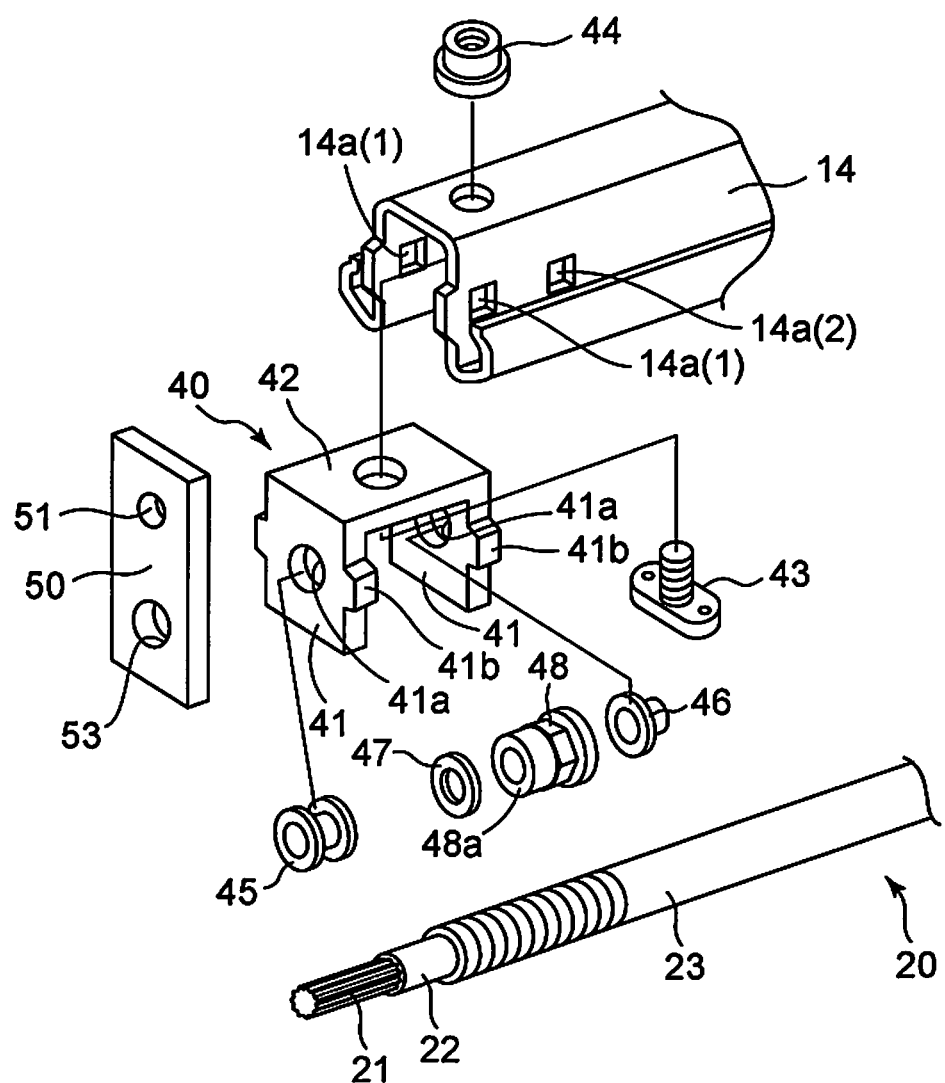
FIG. 2 is a perspective view illustrating a structure around a load transmitting bracket removed from the power slide device shown in FIG. 1.
Figure 3:
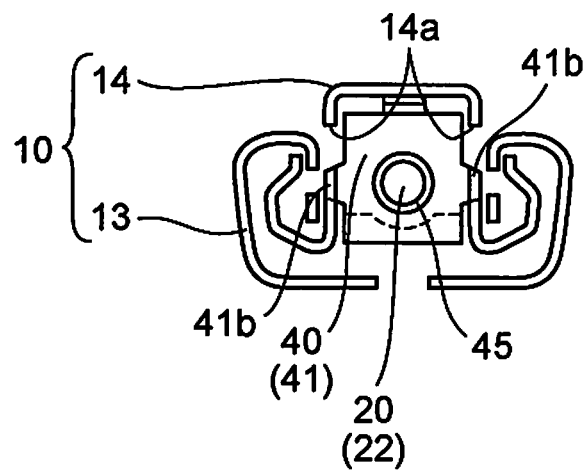
FIG. 3 is a cross sectional view taken along the line III-III shown in FIG. 1.
Figure 4:
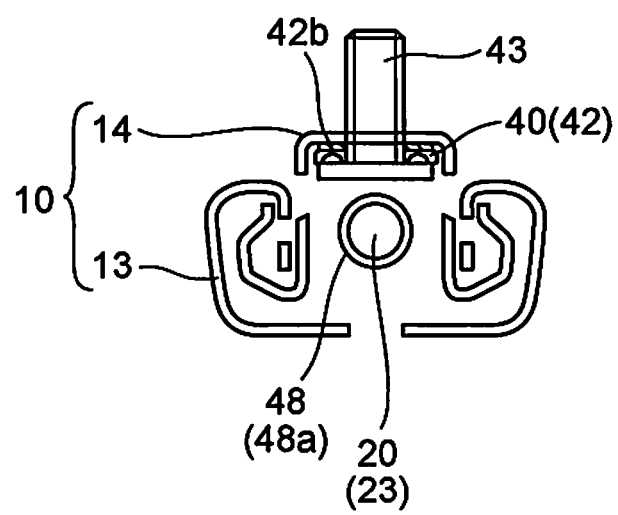
FIG. 4 is a cross sectional view taken along the line IV-IV shown in FIG. 1.

The load transmitting bracket 40 is fixed to the upper rail 14 by a locking bolt 43 which is inserted into the upper rail 14 from the stationary wall 42 and a locking nut 44 which is screwed onto the locking bolt 43. As shown in FIGS. 2 and 3, the pair of load transmitting walls 41 of the load transmitting bracket 40 are provided with a pair of support projections 41b which are engaged in a pair of fixing holes 14a formed in the upper rail 14 to be supported thereby, respectively. In addition, a shock-absorbing rubber sheet 42b is attached between the stationary wall 42 of the load transmitting bracket 40 and the upper rail 14.

A gear box support bracket 50 is fixed to a surface of the load transmitting bracket 40 on the gear box 30 side by welding, and the gear box 30 is supported by the gear box support bracket 50 via a support hole 51 and a locking bolt 52. In addition, an insertion hole 53 into which the screw rod 20 is inserted is formed in the gear box support bracket 50.

A sleeve 45 made of a low-frictional synthetic resin material is fitted into the insertion hole 53 of the gear box support bracket 50 and the insertion hole 41a of one of the pair of load transmitting walls 41 to extend across the insertion holes 53 and 41a, and a similar sleeve 46 is fitted into the insertion hole 41a of the other load transmitting wall 41.

As shown in FIGS. 1 and 2, a small-diameter stepped portion (small-diameter non-threaded portion) 22 which has no male thread and a threaded portion 23 are formed on the screw rod 20 continuously from the serrated portion 21. A washer (load receiving member) 47 which is fitted on the small-diameter stepped portion 22 and attached between (abuts against) an inner surface of one of the load transmitting walls 41 (the load transmitting wall 41 on the gear box 30 side) and a stepped portion of the small-diameter stepped portion 22 to be prevented from moving in the axial direction, and a nut member (load receiving member) 48 which is screwed onto the threaded portion 23 to abut against the other load transmitting wall 41 (the load transmitting wall 41 on the feed nut side) are positioned between the pair of load transmitting walls 41 of the load transmitting bracket 40. The nut member 48 is provided with a thin-walled cylindrical portion 48a, and the nut member 48 is fixed to the screw rod 20 by swaging (plastically deforming) the thin-walled cylindrical portion 48a. In the sleeves 45 and 46 that are respectively fitted into the pair of insertion holes 41a, the sleeve 45 is fitted on the small-diameter stepped portion 22 of the screw rod 20 with a minimum clearance therebetween and supports the screw rod 20 so that it can rotate. On the other hand, the sleeve 46 is formed so that a clearance preventing the sleeve 46 from normally coming into contact with the small-diameter stepped portion 22 is created between the sleeve 46 and the small-diameter stepped portion 22. Although the nut member 48 normally rotates with the screw rod 20, the washer 47 can rotate either with or relative to the screw rod 20 because the position of the washer 47 in the axial direction thereof relative to the screw rod 20 is restricted. Due to providing the washer 47 and the nut member 48, the bearing surface area can be increased and the dimensional adjustment with respect to the pair of load transmitting members 41 can be easily performed.

An application of an impact load to the seat slide device urges the upper rail 14 to move relative to the lower rail 13, and this load is transmitted to the washer 47 or the nut member 48 from the pair of load transmitting walls 41 of the load transmitting bracket 40 to be exerted on the screw rod 20. Accordingly, the load on the gear box 30 is reduced, which makes it possible to prevent the gear box 30 (the worm wheel 32 and the worm 33) from being damaged. Specifically, since the load transmitting bracket 40 is provided with the pair of load transmitting walls 41 and since the washer (load receiving member) 47 and the nut member (load receiving member) 48 that are positioned on the screw rod 20 side are in contact with the pair of load transmitting walls 41, even when a load caused by either a front-end collision or a rear-end collision acts on the upper rail 14 to thereby exert a buckling load on the screw rod 20, two axial points (the contact point between the washer 47 and the associated load transmitting wall 41 and the contact point between the nut member 48 and the associated load transmitting wall 41) can act as fulcrums at which the screw rod 20 buckles. This limits the buckling direction of the screw rod 20, thus making it possible to enhance the impact resistance. This operation and effect can easily be understood if the present embodiment is compared with a conventional product in which there is only one fulcrum at which the screw rod 20 buckles.

Regarding the embodiment shown in FIGS. 1 through 4, a deformation model when the vehicle is subjected to a front-end collision will be hereinafter discussed with reference to FIG. 11. Upon the vehicle being subjected to a front-end collision, the upper rail 14 moves forward relative to the lower rail 13, so that the load transmitting bracket 40 moves forward relative to the screw rod 20. Thereupon, the rear load transmitting wall 41 pushes the screw rod 20 forward via the nut member 48, which consequently causes the washer 47 to push the front load transmitting wall 41 forward to thereby deform the front load transmitting wall 41 (the front load transmitting wall 41 that is originally orthogonal to the axis of the screw rod 20 is deformed in a direction to make a lower part of the front load transmitting wall 41 thrust forward). Since the screw rod 20 is inserted into the insertion holes 41a of the load transmitting walls 41, this deformation of the load transmitting walls 41 urges the screw rod 20 to be deformed in a direction to make the rear axial portion of the screw rod 20 face downward with lower surfaces in the insertion holes 41a with respect to the drawings (surfaces in the insertion holes 41a which are closer to the opening side of the upper rail 14 than the screw rod 20) serving as fulcrums (force application portions) at which the screw rod 20 buckles. However, since the rear portion of the screw rod 20 is supported by the insertion hole 41a of the rear load transmitting wall 41, the rear portion of the screw rod 20 is deformed again, upward with lower surfaces in the insertion holes 41a with respect to the drawings (surfaces in the insertion holes 41a which are closer to the opening side of the upper rail 14 than the screw rod 20) serving as fulcrums (force application portions), which limits the direction of deformation (buckling) of the screw rod 20. This deformation direction is a direction in which the screw rod 20 comes in contact with a wall surface of the upper rail 14 (rod support rail), and makes it possible to obtain a certain degree of deformation suppression effect regardless of the slide position of the upper rail 14 (the position of the seat S in the forward/rearward direction).

Figure 11:
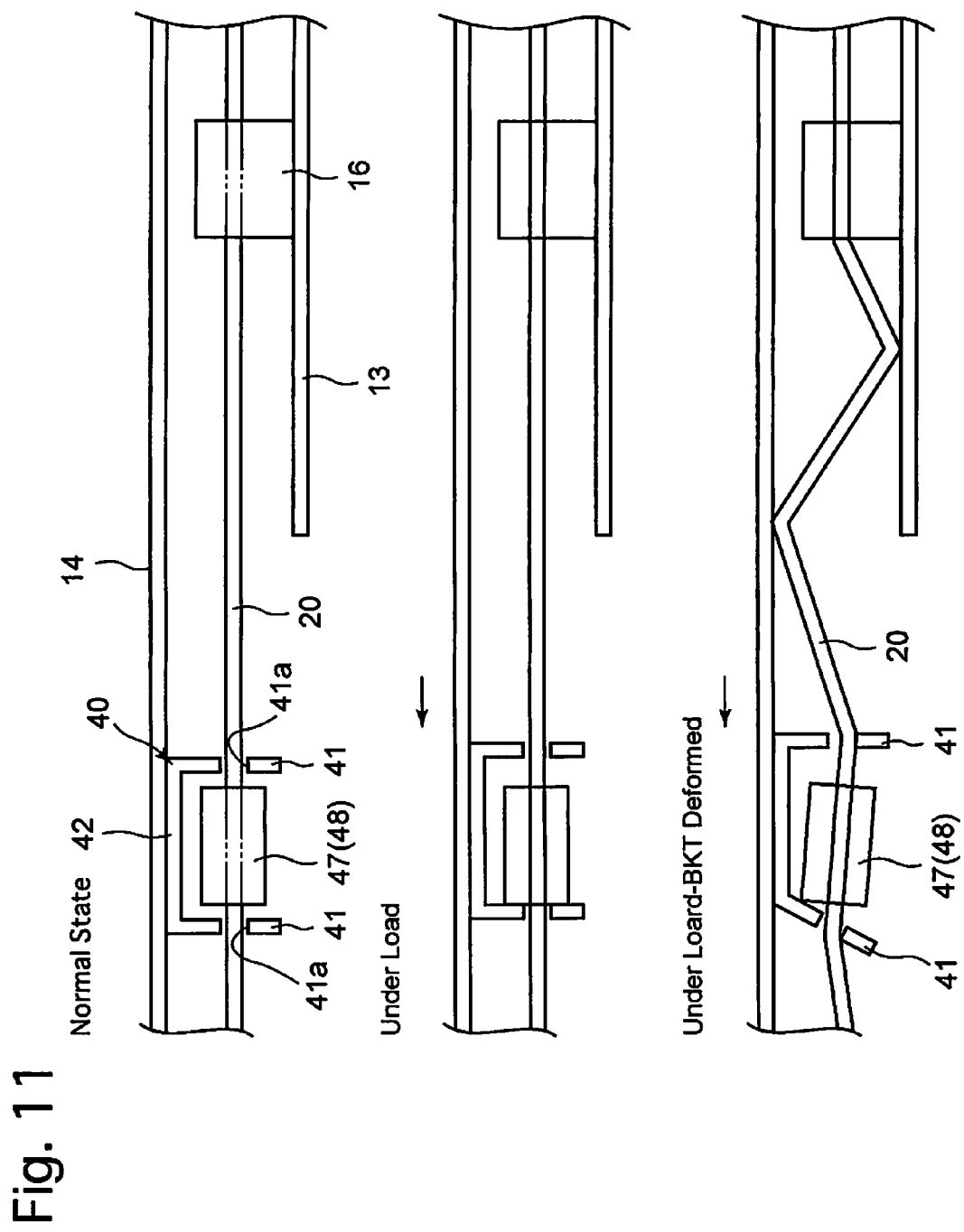
FIG. 11 are illustrations showing, by way of example, a process of deformation of the screw rod upon an occurrence of a collision.

To facilitate the model deformation shown in FIG. 11, it is desirable for one of the pair of load transmitting walls 41 of the load transmitting bracket 40 (the load transmitting wall 41 which is farther from the feed nut 16) to be deformable easier than the other of the pair of load transmitting walls 41 (the load transmitting wall 41 which is closer to the feed nut 16). One way for making one of the pair of load transmitting walls 41 deformable easier than the other is to make the clearances between the support projections 41b that are formed on the pair of load transmitting walls 41 and the fixing holes 14a formed in the upper rail 14 mutually different. More specifically, with respect to FIG. 2, by setting the clearance between the front pair of fixing holes 14a (1) and the associated pair of support projections 41b in the forward/rearward direction greater than the clearance between the rear pair of fixing holes 14a (2) and the associated pair of support projections 41b in the forward/rearward direction, the easiness of deformation of the pair of load transmitting walls 41 can be made to be mutually different. As a matter of course, it is also possible to make the pair of load transmitting walls 41 mutually different in easiness of deformation by, e.g., making the pair of load transmitting walls 41 mutually different in width or thickness.

Figure 12:
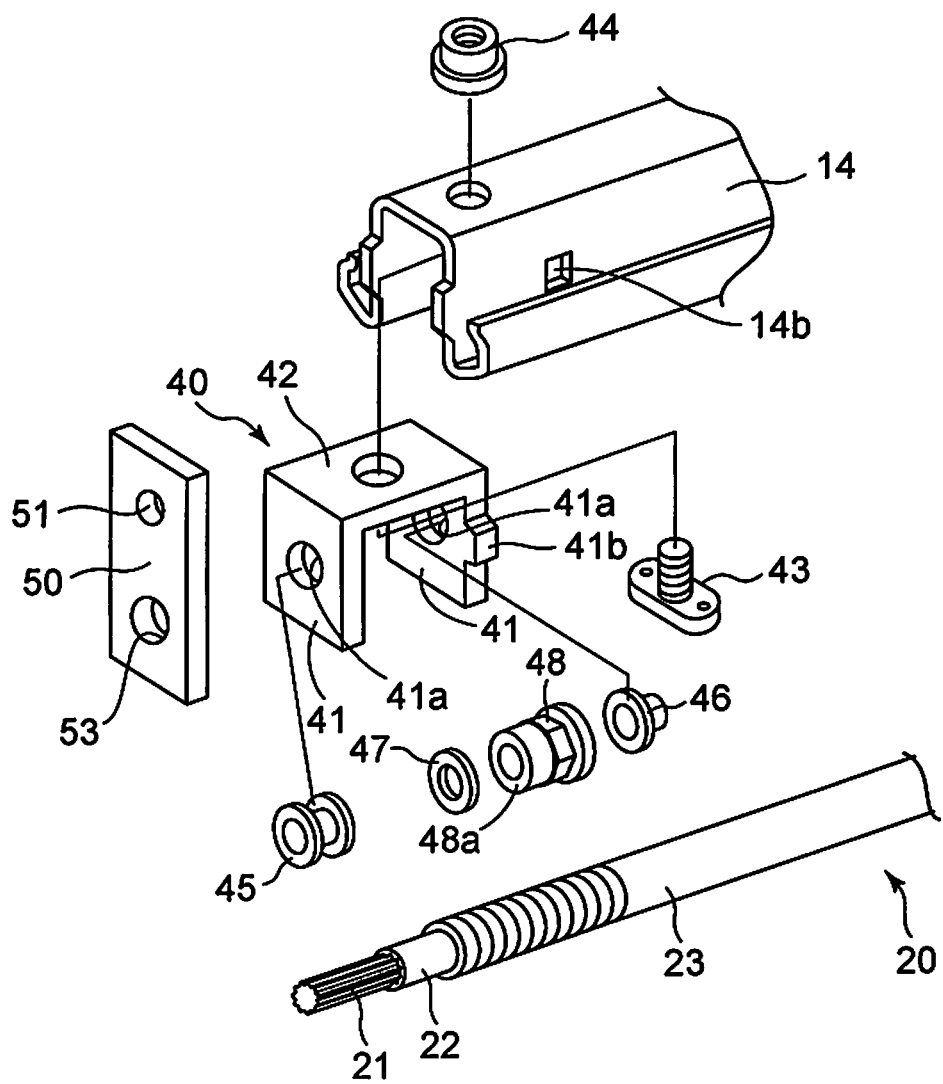
FIG. 12 is a perspective view, corresponding to that of FIG. 2, of a main part of another embodiment of the power slide device according to the present invention.

FIG. 12 shows another configuration example that enables one of the pair of load transmitting walls 41 to be deformed easier than the other. In this embodiment, out of the pair of load transmitting walls 41, the load transmitting wall 41 which is positioned farther from the feed nut 16 is not provided with any support projections (and no associated fixing holes are formed in the upper rail 14), the load transmitting wall 41 which is positioned closer to the feed nut 16 is provided with support projections 41b, and corresponding fixing holes 14a are formed in the upper rail 14. According to this embodiment, the deformation strength of the load transmitting wall 41 having the support projections 41b can be clearly made greater than the deformation strength of the load transmitting wall 41 having no support projections.

The present embodiment of the power slide device can also be applied to a configuration in which the load transmitting bracket 40 is positioned behind the feed nut 16 (a configuration in which the load transmitting bracket 40 is positioned between the feed nut 16 and the bearing member 17). In regard to the discussion with respect to the deformation easiness of the pair of load transmitting walls 41 of the load transmitting bracket 40 in such a case, the load transmitting wall 41 on the far side from the feed nut 16 only needs to satisfy the condition of being easier to be deformed than the load transmitting wall 41 on the near side to the feed nut 16.

In addition, the present embodiment of the power slide device theoretically holds in either of the following two cases where the lower rail 13 and the upper rail 14 are swapped with each other (the screw rod 20 is supported by the lower rail 13 to be rotatable, while the feed nut 16 is fixed to the upper rail 14) and where the front and rear of the lower rail 13 and the upper rail 14 are reversed; however, either of these two cases only needs to satisfy the above described condition. However, the present embodiment, as described above, has the operational effect of being able to limit the buckling direction of the screw rod 20 by providing the pair of load transmitting walls 41 on the load transmitting bracket 40, and the theory of the deformation model shown in FIG. 11 is an example.

FIGS. 5 through 10 show other embodiments according to the present invention.

Figure 5:
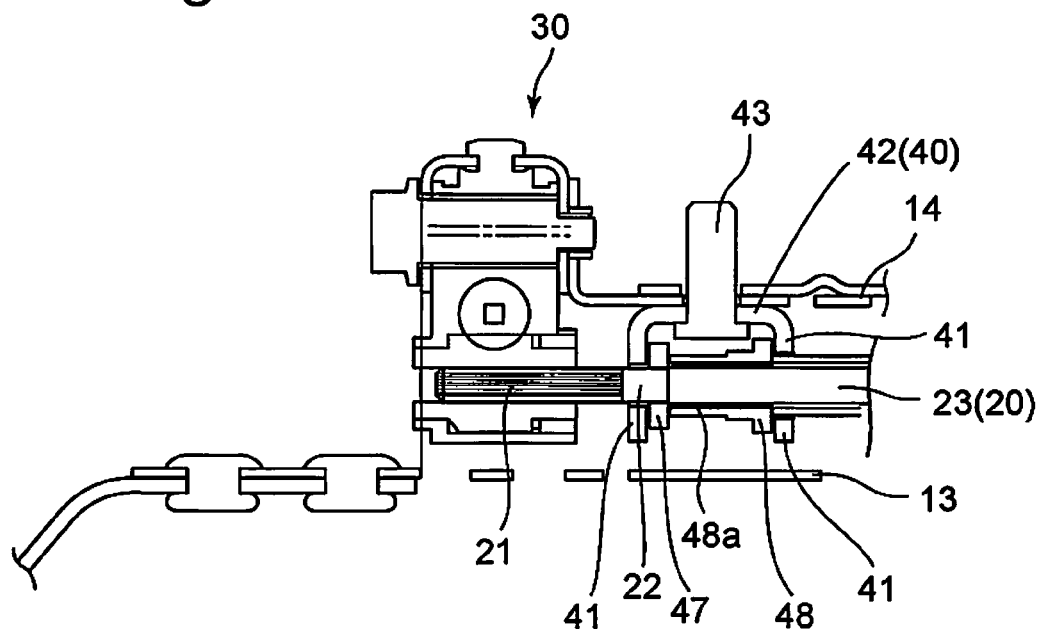
FIG. 5 is a longitudinal sectional view, corresponding to that of FIG. 1, of a main part of another embodiment of the power slide device according to the present invention.

FIG. 5 shows an embodiment in which the gear box 30 is fixed to the upper rail 14. The load transmitting bracket 40 is not involved in supporting the gear box 30.

Figure 6:
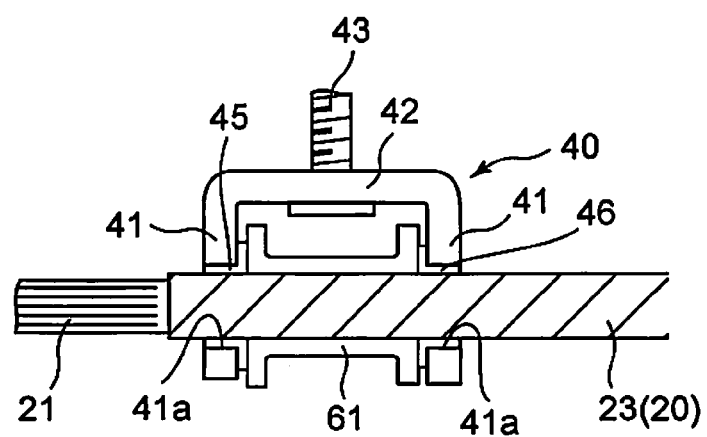
FIG. 6 is a longitudinal sectional view of a main part of the power slide device, showing another embodiment of a screw rod and a load receiving member of the power slide device.

FIG. 6 shows an embodiment using a single nut member 61 as a load receiving member which is positioned between the pair of load transmitting walls 41 of the load transmitting bracket 40 and screwed onto the threaded portion 23 of the screw rod 20 to be fixed thereto. According to the single nut member 61, the structure can be simplified.

Figure 7:
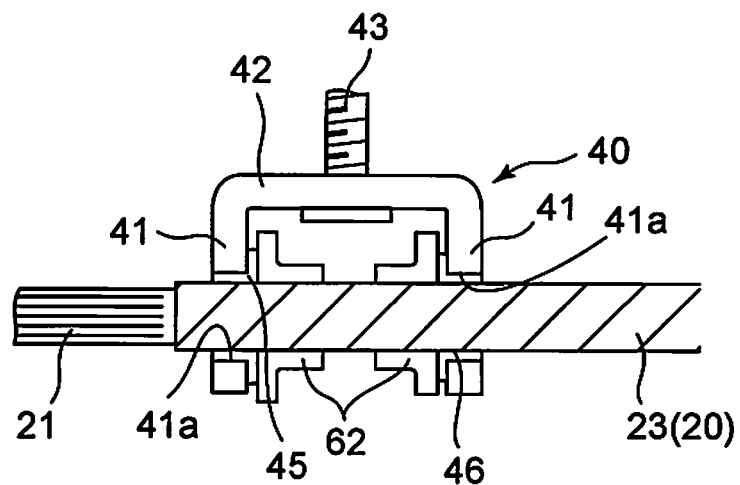
FIG. 7 is a longitudinal sectional view of a main part of the power slide device, showing still another embodiment of the screw rod and the load receiving member of the power slide device.

FIG. 7 shows an embodiment using a pair of nut members 62 as the same load receiving member. Due to the pair of nut members 62, the dimensional adjustment with respect to the pair of load transmitting members 41 can be easily performed.

Figure 8:
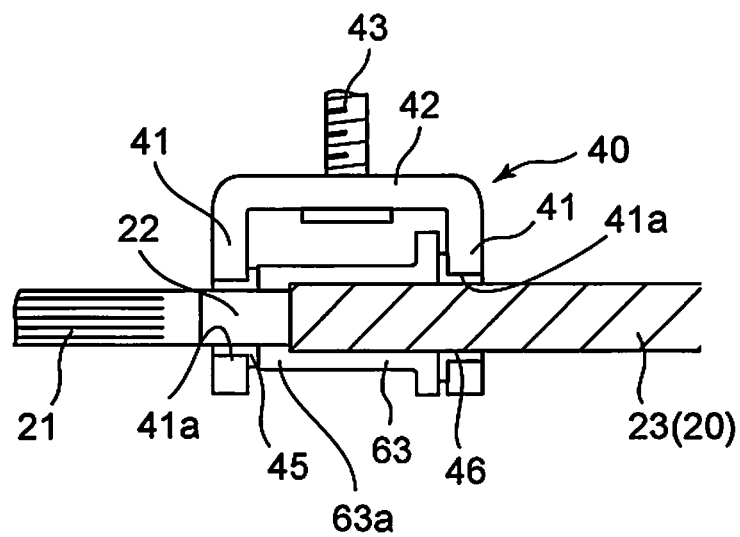
FIG. 8 is a longitudinal sectional view of a main part of the power slide device, showing still another embodiment of the screw rod and the load receiving member of the power slide device.

FIG. 8 shows an embodiment using a single nut member 63 as the same load receiving member that is screwed onto the threaded portion 23 of the screw rod 20 and equipped with a small-diameter stepped portion 63a without having a female thread that is engaged with the small-diameter stepped portion 22 of the screw rod 20. Providing the small-diameter stepped portion 63a makes it possible to increase the bearing surface area between the screw rod 20 and the nut member 63.

Figure 9:
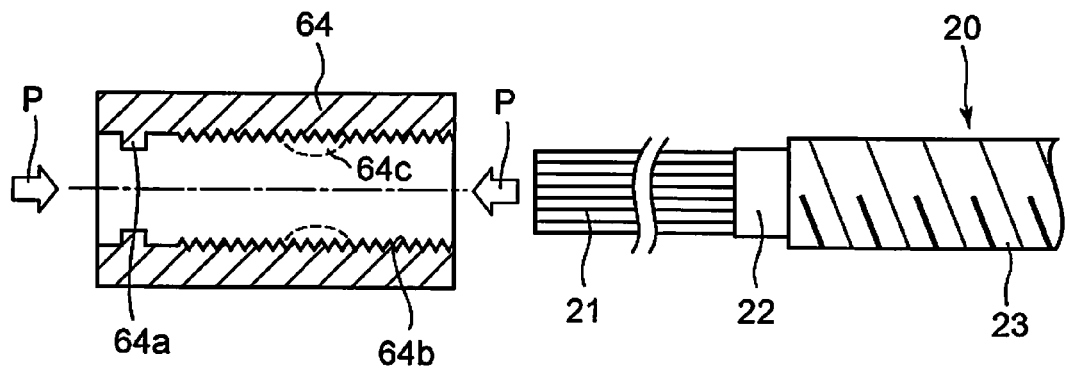
FIG. 9 is an illustration showing a state before the screw rod and a nut member are screw-engaged with each other, showing still another embodiment of the screw rod and the load receiving member of the power slide device.

In any of the nut members having the different configurations described above, it is desirable that the nut member be plastically deformed to make the inner diameter of the female thread portion thereof smaller than the nominal diameter to thereby provide the nut member with a locking portion which increases the rotational resistance to the screw rod before the nut member is screwed onto the screw rod 20. FIG. 9 shows an example of providing the single nut member 64 with such a locking portion. A small-diameter stepped portion 64a which is engaged with the small-diameter stepped portion 22 of the screw rod 20 and a female thread 64b which is engaged with the threaded portion 23 are coaxially formed on the nut member 64. A small-diameter portion 64c which is smaller in diameter than the nominal diameter is formed on the female thread 64b by exerting a compressive load on the nut member 64 in an axial direction thereof. Forming the small-diameter portion 64c in this manner makes it possible to increase the rotational resistance caused when the nut member 64 is screwed onto the screw rod 20, thus making it possible to omit an extra swaging processing (fixing means) performed after the nut member 64 is screwed onto the screw rod 20.

Figure 10:
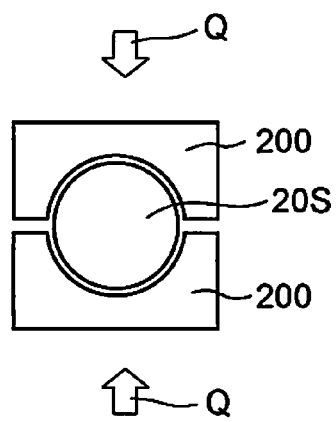
FIG. 10 is a diagrammatic illustration showing a compression forming process that is performed on a round bar blank which is used to form the screw rod.

FIG. 10 shows an embodiment in which a reducing process is performed on a round bar blank 20S, which corresponds to the screw rod 20 before threading is performed thereon, via compression molds 200 by exerting a compressive load Q on the round bar blank 20S in a radial direction thereof. This reducing process is performed on the round bar blank 20S before threading is performed thereon to form the threaded portion 23. Performing the reducing process, which applies the compressive load Q onto the round bar blank 20S, in such a manner makes it possible to increase the mechanical strength of the screw rod 20.

INDUSTRIAL APPLICABILITY

The power slide device for a vehicle seat according to the present invention can be applied widely to a front seat of a passenger vehicle, and improve the impact resistance force and enhance safety.

DESCRIPTION OF THE NUMERALS

S Vehicle seat
F Floor surface
10 Seat track
13 Lower rail
14 Upper rail
14a Fixing hole
15 Locking bolt
16 Feed nut
17 Bearing member
20 Screw rod
21 Serrated portion
22 Small-diameter stepped portion
23 Threaded portion
30 Gear box
32 Worm wheel
32a Serrated hole
33 Worm
40 Load transmitting bracket
41 Load transmitting wall (load transmitting member)
41a Insertion hole
41b Support projection
42 Stationary wall
43 Locking bolt
44 Locking nut
45 46 Sleeves
47 Washer (load receiving member)
48 Nut member (load receiving member)
50 Gear box support bracket
61 63 Single nut members (load receiving members)
62 Pair of nut members (load receiving members)

The invention claimed is:

1. A power slide device for vehicle seat, comprising:
a lower rail disposed on a floor surface of a vehicle;
an upper rail disposed on a seat and engaged with said lower rail in a slidable manner;
a screw-rod which is rotatably supported by a screw-rod supporting rail, wherein one of said upper rail and said lower rail comprises said screw-rod supporting rail;
a gear box, provided at an end of said screw-rod supporting rail, for rotationally driving said screw-rod;
a feed-nut which is screw-engaged with said screw-rod and fixed to a feed-nut supporting rail, wherein the other of said upper rail and said lower rail comprises said feed-nut supporting rail;
a pair of load transmitting members which are held by said screw-rod supporting rail at positions spaced from each other in an extension direction of said screw-rod supporting rail; and
at least one load receiving member which is positioned between said pair of load transmitting members and provided on said screw-rod in a manner to restrict a position of said load receiving member on said screw-rod in an axial direction thereof, wherein said feed-nut supporting rail and said screw-rod supporting rail are respectively provided with openings which face each other, and wherein said pair of load transmitting members are provided with force application portions that are positioned closer to an opening of said screw-rod supporting rail than said screw-rod.

2. The power slide device for a vehicle seat according to claim 1, wherein a load transmission from said seat to said vehicle is performed in order from one of said pair of load transmitting members, said at least one load receiving member and the other of said pair of load transmitting members.

3. The power slide device for a vehicle seat according to claim 1, wherein said at least one load receiving member comprises a single nut member which is screwed onto said screw-rod to be fixed to said screw-rod.

4. The power slide device for a vehicle seat according to claim 3, wherein said single nut member comprises a small-diameter stepped portion having no female thread, and wherein said screw-rod comprises a small-diameter stepped portion having no male thread and corresponds to said small-diameter stepped portion of said single nut member.

5. The power slide device for a vehicle seat according to claim 1, wherein said at least one load receiving member comprises a pair of nut members which are screwed onto said screw-rod to be fixed to said screw-rod.

6. The power slide device for a vehicle seat according to claim 1, wherein a load receiving member comprises a washer member which is fitted on a small-diameter step portion of said screw-rod which has no male thread and a nut member which is screwed onto said screw-rod to be fixed to said screw-rod.

7. The power slide device for a vehicle seat according to claim 3, wherein, before said nut member is screwed onto said screw-rod, said nut member is plastically deformed to make an inner diameter of a female thread portion of said nut member smaller than a nominal diameter to thereby provide said nut member with a locking portion which increases a rotational resistance to said screw-rod.

8. The power slide device for a vehicle seat according to claim 1, wherein a fixing device for fixing said at least one load receiving member and said screw-rod to each other comprises one of swaging, fastening with glue, and a knock-pin.

9. The power slide device for a vehicle seat according to claim 1, wherein said gear box is supported by said pair of load transmitting members.

10. The power slide device for a vehicle seat according to claim 1, wherein said gear box is supported by said screw-rod supporting rail via a different member from said pair of load transmitting members.

11. The power slide device for a vehicle seat according to claim 1, wherein said gear box is supported directly by said screw-rod supporting rail, and wherein said pair of load transmitting members do not support said gear box.

12. The power slide device for a vehicle seat according to claim 1, wherein said pair of load transmitting members are connected to each other.

13. The power slide device for a vehicle seat according to claim 1, wherein one of said pair of load transmitting members which is closer to said feed-nut either is supported in a manner so as not to be easily deformed by a force in a forward/rearward direction of said vehicle or has a characteristic of not being easily deformed by said force in said forward/rearward direction of said vehicle, and wherein force application portions of said pair of load transmitting members come in contact with said screw-rod to provide said screw-rod with fulcrums at which said screw-rod buckles when the load transmitting member is deformed.

14. The power slide device for a vehicle seat according to claim 13, wherein said one of said pair of load transmitting members which is disposed closer to said feed-nut comprises a plurality of support projections, which are engaged in a plurality of fixing holes formed in said screw-rod supporting rail, respectively, and wherein the other of said pair of load transmitting members which is farther from said feed-nut is not provided with support projections.

15. The power slide device for a vehicle seat according to claim 13, wherein each of said pair of load transmitting members comprises a plurality of support projections, wherein said screw-rod supporting rail has a plurality of fixing holes in which said plurality of support projections are engaged, and wherein clearances between support projections of said pair of load transmitting members and fixing holes of said screw-rod supporting rail in said forward/rearward direction are set so that a clearance between the support projections of the load transmitting member which is farther from said feed-nut and the fixing holes engaged therewith is set greater than a clearance between the support projections of the load transmitting member which is closer to said feed-nut and the fixing holes engaged therewith.

16. The power slide device for a vehicle seat according to claim 1, wherein said gear box, said load transmitting members and said feed-nut are arranged in that order in the axial direction of said screw rod.

17. The power slide device for a vehicle seat according to claim 3, wherein, before said nut member is screwed onto said screw-rod, said nut member is plastically deformed to make an inner diameter of a female thread portion of said nut member smaller than a nominal diameter to thereby provide said nut member with a locking portion which increases a rotational resistance to said screw-rod.

18. The power slide device for a vehicle seat according to claim 4, wherein, before said nut member is screwed onto said see screw-rod, said nut member is plastically deformed to make an inner diameter of a female thread portion of said nut member smaller than a nominal diameter to thereby provide said nut member with a locking portion which increases a rotational resistance to said screw-rod.

19. The power slide device for a vehicle seat according to claim 5, wherein, before said nut member is screwed onto said screw-rod, said nut member is plastically deformed to make an inner diameter of a female thread portion of said nut member smaller than a nominal diameter to thereby provide said nut member with a locking portion which increases a rotational resistance to said screw-rod.

20. The power slide device for a vehicle seat according to claim 6, wherein, before said nut member is screwed onto said screw-rod, said nut member is plastically deformed to make an inner diameter of a female thread portion of said nut member smaller than a nominal diameter to thereby provide said nut member with a locking portion which increases a rotational resistance to said screw-rod.

* * * * *

UNITED STATES PATENT AND TRADEMARK OFFICE
CERTIFICATE OF CORRECTION

PATENT NO. : 8,523,263 B2
APPLICATION NO. : 13/000441
DATED : September 3, 2013
INVENTOR(S) : Akihiro Kimura et al.

It is certified that error appears in the above-identified patent and that said Letters Patent is hereby corrected as shown below:

In the Claims

Column 12, line 4 reads "see screw-rod", should read --screw-rod--.

Signed and Sealed this
Twelfth Day of November, 2013

Teresa Stanek Rea
*Deputy Director of the United States Patent and Trademark Office*